US011877683B1

(12) United States Patent
Shavers

(10) Patent No.: US 11,877,683 B1
(45) Date of Patent: Jan. 23, 2024

(54) TREE LIGHTING SYSTEM

(71) Applicant: Blue Crown LLC, Norfolk, VA (US)

(72) Inventor: Sjon Shavers, Leesburg, VA (US)

( * ) Notice: Subject to any disclaimer, the term of this patent is extended or adjusted under 35 U.S.C. 154(b) by 0 days.

(21) Appl. No.: 18/221,291

(22) Filed: Jul. 12, 2023

(51) Int. Cl.
*F21V 23/00* (2015.01)
*A47G 33/08* (2006.01)
*F21V 21/00* (2006.01)

(52) U.S. Cl.
CPC .......... *A47G 33/0863* (2013.01); *F21V 21/00* (2013.01); *F21V 23/002* (2013.01); *A47G 2033/0827* (2013.01)

(58) Field of Classification Search
CPC .................. F21V 21/00; F21V 23/002; A47G 2033/0827
See application file for complete search history.

(56) References Cited

U.S. PATENT DOCUMENTS 4,736,282 A 5/1988 Ahroni
5,746,504 A 5/1998 Dodson
8,087,796 B2 * 1/2012 Golembiowski ......... F21S 4/20 362/396
8,376,584 B1 * 2/2013 Jenko ........................ F21S 4/10 362/249.18
11,641,968 B1 * 5/2023 Zou ...................... A47G 33/126 362/249.14
2006/0261745 A1 * 11/2006 Beitler .................. H05B 39/00 315/185 R
2012/0027961 A1 * 2/2012 Fogle ................ A47G 33/0863 428/7
2016/0178172 A1 * 6/2016 Boyink ................. F21V 23/008 362/249.06
2018/0042421 A1 * 2/2018 Bennett .................. A47G 33/10

* cited by examiner

*Primary Examiner* — Evan P Dzierzynski
(74) *Attorney, Agent, or Firm* — Sanchelima & Associates, P.A.; Christian Sanchelima; Jesus Sanchelima

(57) ABSTRACT

A tree lighting system including a support assembly, a lighting assembly, and a hanging assembly. Support assembly includes a collar adapted to sit atop a portion of a Christmas tree by means of rods inserted in the collar to securely place the collar on the branches of an ornamental tree. The collar integrates electrical plugs configured to receive a series of strands. The strands feature lights along thereof to provide an aesthetic lighted appeal to the tree. A light controller connected to the plugs controls and power said lights through the plugs when the strands are connected. Users are capable of conveniently adjusting lighting configurations of the lights with the press of a control means, offering a versatile, and visually appealing solution for installing and illuminating the Christmas tree.

1 Claim, 3 Drawing Sheets

TREE LIGHTING SYSTEM

1. FIELD OF THE INVENTION

The present invention relates to a lighting system and, more particularly, to a tree lighting system that features a collar strategically mounted near the to the top of an ornamental tree or any other suitable structure, having strands of lights hanging from the collar throughout the tree.

2. DESCRIPTION OF THE RELATED ART

Several designs for tree lighting systems have been designed in the past. None of them, however, include a collar with removable strands of lights. The collar is capable of being mounted on top of a Christmas tree using rods with C-shaped ends, providing a secure and stable attachment. Additionally, the collar is equipped with a light controller that allows users to activate and customize the lighting effect.

Applicant believes that a related reference corresponds to U.S. Pat. No. 5,746,504 issued for Christmas tree light ring. Applicant believes that another related reference corresponds to U.S. Pat. No. 4,736,282 issued for decorative light assembly with tree collar. None of these references, however, teach of a collar having integral power, and a plurality of interchangeable or replaceable strings of light which receive power from the collar.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objectives of the present invention to provide a device with replaceable strands of light, making the installation hassle-free.

It is another objective of this invention to provide a device that is placed on top of the tree using specially configured rods to ensure an easy and secure attachment, saving time and effort.

It is still another objective of the present invention to provide a device distributed throughout the tree, resulting in a well-balanced and illuminated effect while providing a versatile customization of lighting effects.

It is yet another objective of this invention to provide such a device that is inexpensive to implement and maintain while retaining its effectiveness.

Further objectives of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 3:
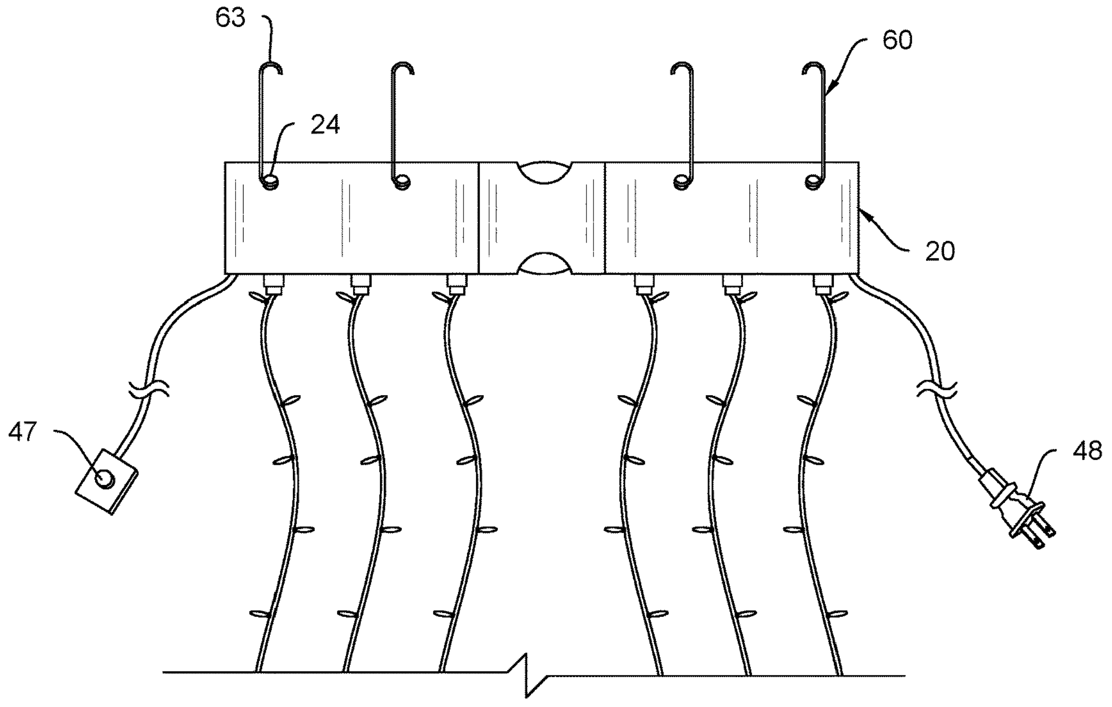

FIG. 3 illustrates a lateral view of the support assembly 20 including the strands 42 connected to the collar 22 and the hanging assembly 60 coupled to the collar 20 through the plurality of holes 24.

Figure 4:
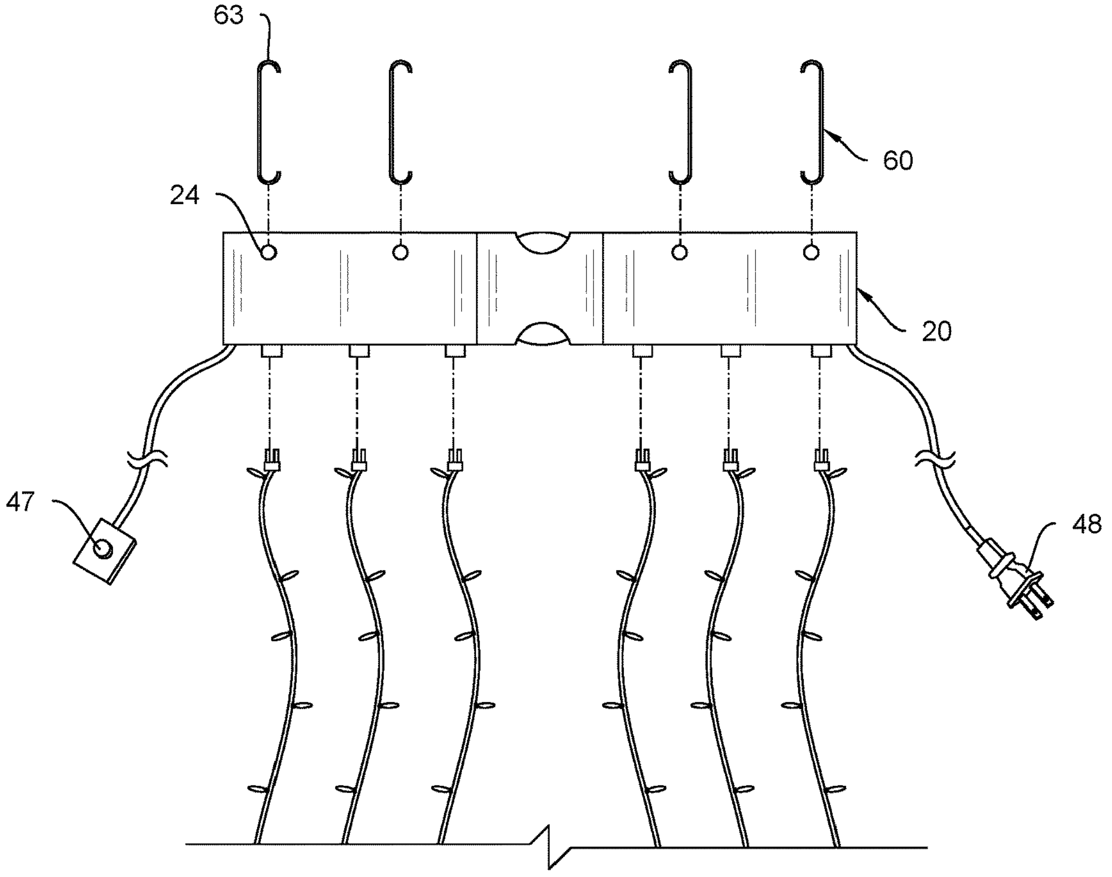

FIG. 4 is a representation of an exploded view of the support assembly 20, strands 42 and the hanging assembly 60.

V. DETAILED DESCRIPTION OF THE EMBODIMENTS OF THE INVENTION

Referring now to the drawings, where the present invention is generally referred to with numeral 10, it can be observed that it basically includes a support assembly 20, a lighting assembly 40, a hanging assembly 60, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
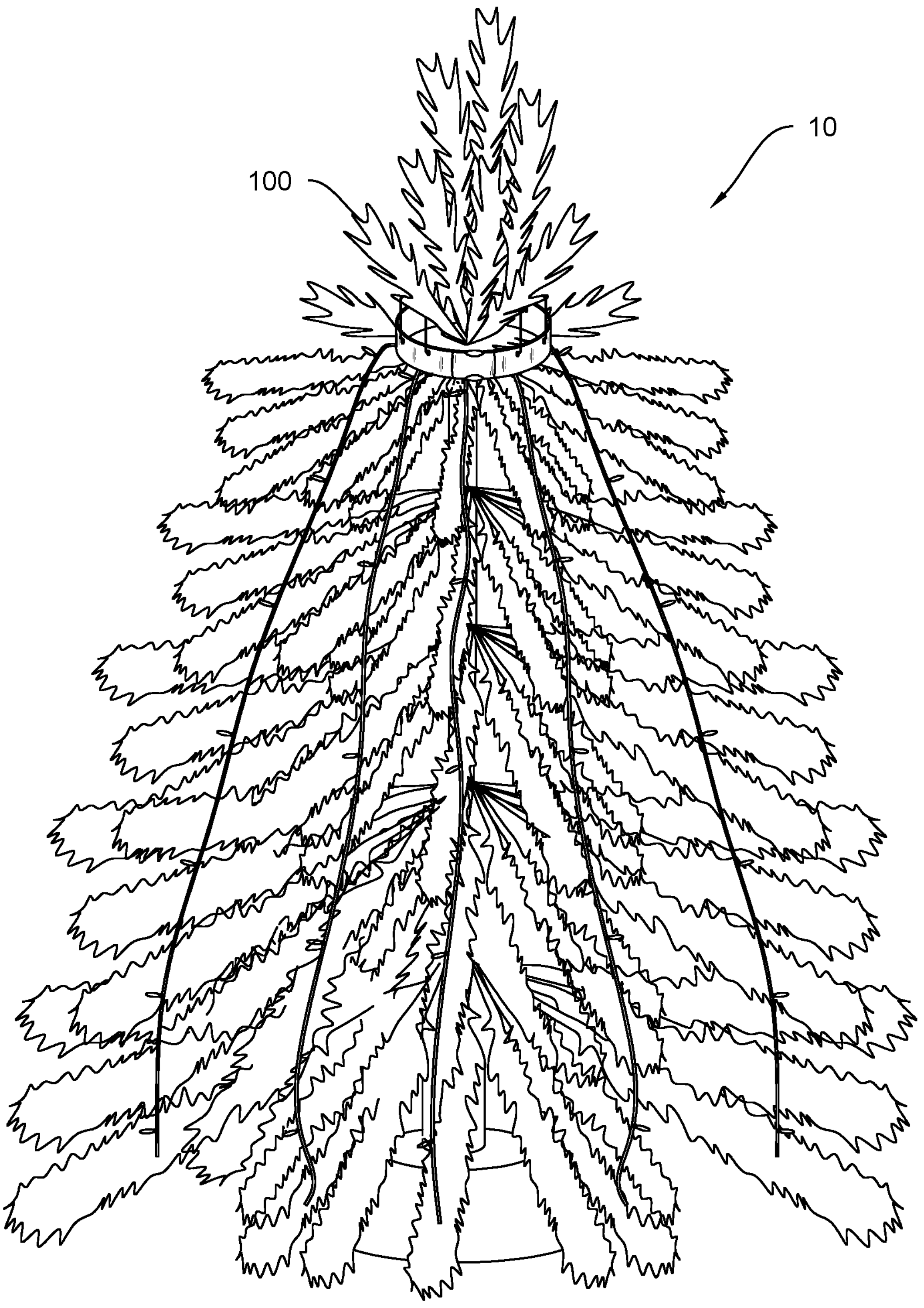
FIG. 1 represents an operational view of an exemplary embodiment of the present invention 10.
Figure 2:
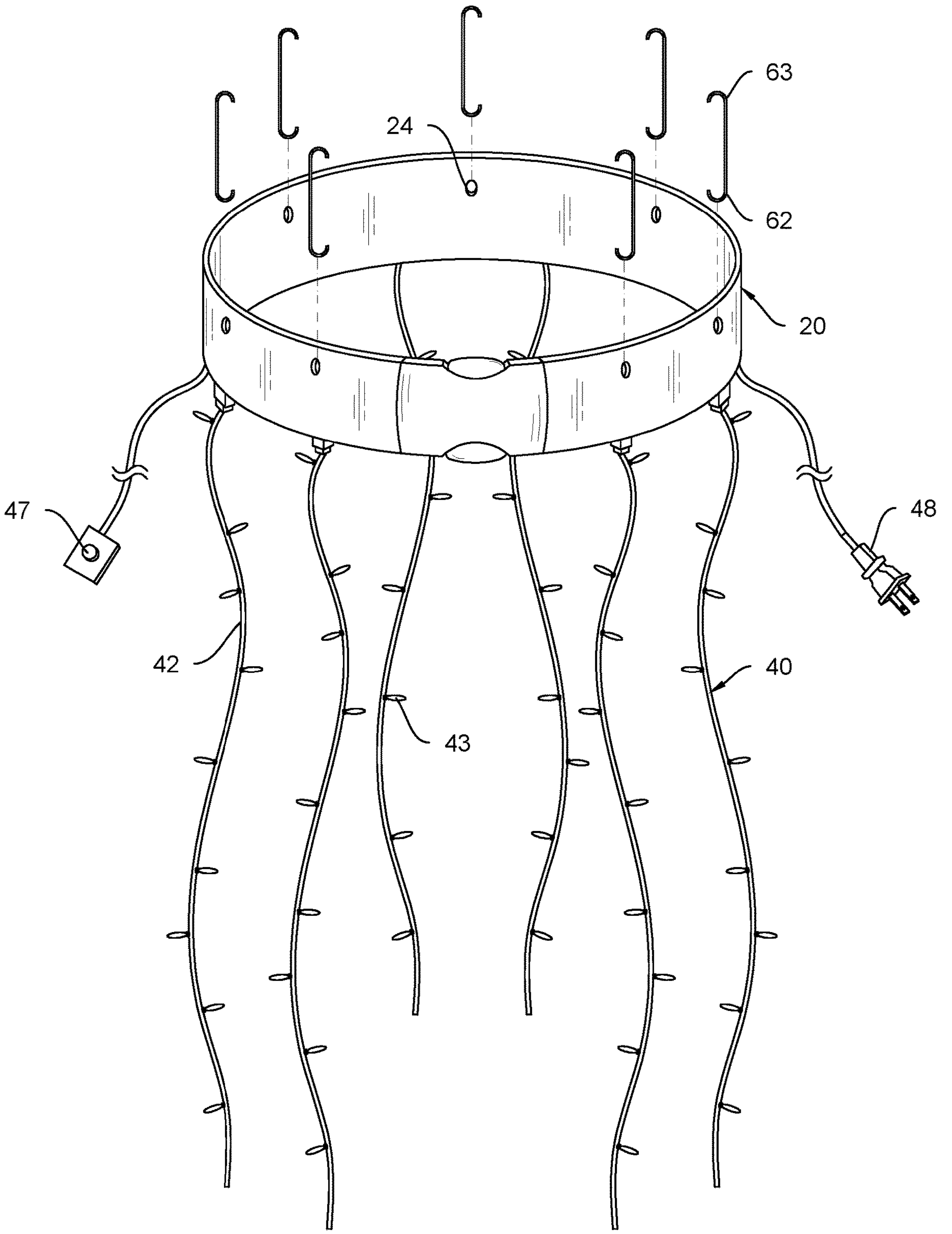
FIG. 2 shows an operation view of the present invention 10 assembled.

Support assembly includes a collar 22, a plurality of holes 24, plugs 26, and a fastener 28. In an exemplary embodiment, collar 22 may be a rectangular strip when thoroughly extended, allowing the collar 22 to conform and maintain a circular shape when closed, featuring an internal diameter that matches the dimension of the top portion of a Christmas tree 100 or any other suitable ornamental embodiment, best depicted in FIG. 1. It should be understood that the shape of collar 22 illustrated in FIG. 2 is not limited to a circular shape, being a hexagonal shape, a star shape, a regular shape, an irregular shape, or any other suitable shape that allows the collar 22 to be placed near the top of the Christmas tree 100. In a suitable embodiment, collar 22 may be made of any flexible material, including, but not limited to, plastic, fabric with stiff interfacing, foam core board, nylon, rubber, fabric, or any other suitable material that allows the collar to be flexed. The collar 22 may be resistant to wear and tear while providing an aesthetic appeal. In a preferred embodiment, the collar 22 features a plurality of holes 24 equidistantly spaced from each other, positioned at regular intervals around the wall that defines the collar 22, as FIG. 2 depicts. In one embodiment, collar 22 further includes plugs 26 positioned on a bottom side thereof, as FIG. 4 shows. Nonetheless, the plugs 26 may be strategically placed in any other suitable portion of the collar 22. Plugs 26 serves as the interface for seamlessly integrating strands 42 around the collar 22. In a suitable embodiment, plugs 26 serves as attachment points to securely receive the strands 42 by means of connectors 44 integrated in the strands, ensuring a reliable electrical connection, as best illustrated in FIG. 3. It may be considered that plugs 26 includes a suitable locking mechanism enabling the connectors 44 to securely slide through and establish a secure connection between the plugs 26 and the connectors 44. In another embodiment, the fastener 28 is utilized to maintain the circular shape of the collar 28, acting as a fastening member. The collar 22 surrounds a specific portion of the Christmas three 100, enabling the user to unlock and lock the fastener 28 for easy placement and removal of the collar 22 around the Christmas tree 100. It should be considered that fastener 28 may take the form of a side release buckle, a seat belt buckle, a side squeeze buckle, a tension lock buckle, or any other suitable fastener to secure that securely holds the distal ends of the collar 22 to preserve the circular shape, best observed in FIG. 2.

Lighting assembly 40 includes strands 42, lights 43, connectors 44, a light controller 46, and control means 47. In an exemplary embodiment, the strands 42 are a series of interconnected lights spaced along the body of the strands. Strands 42 typically includes a flexible wire or cable featuring sockets or holders where lights 43 are inserted. Strands 42 are made of an insulated material, such as plastic, rubber or the like, protecting the internal wiring from wear and tear, dust, moisture, and water. It should be considered that the length of the strands 42 may vary or may have suitable length to be accommodated along the Christmas tree 100 in its various embodiments. In a suitable embodiment, strands integrate the connectors 44 at one end thereof, allowing for easy connections with the plugs 26, providing replaceable strands 42 when required, as FIG. 4 represents. In one embodiment, lights 43 may be LED lights, Twinkle lights, fairy lights, globe lights, or any other suitable type of light well known in the prior art to provide a multi-colored series of strands 42. It should be considered that connectors 44 are electrical connectors with a predetermined configuration to be removable attachable to the plugs 26, using prongs, pins, or any other suitable mechanism to ensure proper alignment and a snug fit when the connectors 44 are attached to the plugs 26, such as Molex connectors JST connectors, AMP connectors, Hirose connectors, AE connectors, or the like. This configuration allows the user effortless installation and removal. In other embodiment, the light controller 46 may be electrically connected to the plug 26 through the collar 22, as FIG. 2 illustrates. The light controller 46 is a centralized device that provides convenient control and power management for the lights 43 through the strands 42 when connected. The light controller 46 may be a housing or enclosure connected to the collar 22 by means of a wire, serving as the primary interface for controlling the lights 43 by means of the control means 47. In a suitable variation, light controller 46 may be wirelessly connected to the lights 43, wherein the light controller 46 may include the proper hardware and software to create a wireless connection with the lights 43 and/or plugs 26. In one embodiment, control means 47 may be an electrical device, such as a push button, a switch device, a dimmer, a suitable electric device, or a combination thereof. Each press of the control means 47 activates a predetermined lighting configuration of the lights 43, such as a steady configuration, a twinkle configuration, a flashing configuration, a sequential pattern, color changing, or a combination thereof. A predetermined configuration of the press of control means 47 allows the lights 43 to be turned on or off. In a preferred embodiment, the light controller 46 is equipped with the necessary components, such as circuitry, microcontrollers, and power supply, to control, regulate and power the lights 43. It may be considered for the collar 22 to incorporate a replaceable or rechargeable battery which is electrically connected to the light controller 46 and the lights 43 to supply a required voltage and current. In a one embodiment, Lighting assembly 40 further integrates an electrical cord 48 to conduit electrical current for the lights 42. The cord 48 may be electrically connected to the control box 46 and the strands of light 43, allowing the electrical current to flow from a power source to the lights 43 through the strands 42 when connected to the plugs 26.

Hanging assembly 60 includes rods 62. In an exemplary embodiment, rods 62 are made of a semi-flexible plastic material. In a suitable material, the semi-flexible body of the rods 62 allows a distal end 63 and a proximal end 64 thereof to be shaped in an C configuration, as FIG. 4 demonstrates. The C-shaped distal end 63 and proximal end 64 of the rods 62 are adapted to securely hold the collar 22 in place on the branches of the Christmas tree, best depicted in FIG. 1. It should be understood that the user may insert each rod of the rods 62 through the corresponding hole of the plurality of holes 24, ensuring that the distal end 63 is facing downwards. The user may position the collar 22 on top of the three and accommodating the proximal end 64 of each rod in the branches until the rods 62 are securely attached, thereby the user may connect and accommodate each strand of the strands 42 accordingly all over the Christmas tree 100, as FIG. 4 and further FIG. 1 represents.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tree lighting system, consisting of:

a) a support assembly including a collar, a plurality of holes, and plugs, wherein said collar is capable of forming a circular shape, said collar includes a central opening with a diameter that matches a dimension of a top portion of a tree, said holes are positioned around said collar, said plugs are electrical plugs integrated around said collar, said collar includes a fastener to maintain said circular shape, wherein said collar is made of a flexible material, allowing said collar to form and maintain said circular shape by means of said fastener, said plurality of holes are equidistantly spaced therebetween on top of said collar;

b) a lighting assembly, having strands, lights, a connector, a light controller, and a control means, wherein said lights are integrated along said strands, wherein said strands are wires electrically connected to said plugs by means of said connectors, said light controller is integrated in said collar, wherein said light controller features said control means to control said lights, said strands are electrical wires covered with an insulated material against dust, moisture, and water, wherein said light controller includes the necessary circuitry to control and receive a power supply for regulating and powering said lights, said control means when pressed in a predetermined configuration allows said lights to turn on/off and activates a predetermined lighting configuration, said connectors of said strands are connected and removed from said plugs when required, providing replaceable strands; and c) a hanging assembly containing a plurality of rods, wherein each of said plurality of rods have a distal end and a proximal end, wherein said plurality of rods pass through said plurality of holes to hang said collar on top of said tree, wherein said distal end and said proximal end of said plurality of rods are C-shaped ends.

* * * * *